United States Patent [19]
Abou-Ezzeddine
[11] 4,389,036
[45] Jun. 21, 1983

[54] APPARATUS AND METHOD FOR FORMING CONCRETE BLOCKS, PANELS AND THE LIKE

[76] Inventor: Youssef Abou-Ezzeddine, 5821 Lynbrook, Houston, Tex. 77057

[21] Appl. No.: 256,064

[22] Filed: Apr. 21, 1981

[51] Int. Cl.³ .......... B28B 7/10; B29C 1/14
[52] U.S. Cl. .......... 249/120; 249/64; 249/66 R; 249/124; 249/142; 249/144; 249/151
[58] Field of Search .......... 264/334, 336; 249/142, 249/151, 139, 66 R, 119, 120, 124, 129, 160, 163, 122, 128, 131, 125, 135, 76, 118, 161; 294/67 E; 425/182, 253, 254, 255, 424

[56] References Cited

U.S. PATENT DOCUMENTS

| | | | |
|---|---|---|---|
| 243,504 | 6/1881 | Carnell | 249/120 |
| 585,154 | 6/1897 | Beddell | 249/139 |
| 720,536 | 2/1903 | Seamans | 249/122 |
| 754,550 | 3/1904 | Dunn | 249/163 |
| 769,771 | 9/1904 | Seamans | 249/125 |
| 818,452 | 4/1906 | Judie | 249/120 |
| 824,235 | 6/1906 | Damon | 249/129 |
| 825,489 | 7/1906 | Scott | 249/139 |
| 831,230 | 7/1906 | Latimer | 249/122 |
| 850,368 | 4/1907 | Herring | 249/139 |
| 880,495 | 3/1908 | Barnes | 249/120 |
| 892,583 | 7/1908 | Colvin | 249/125 |
| 940,983 | 11/1909 | Meeker et al. | 249/120 |
| 968,111 | 8/1910 | Bennett | 249/129 |
| 1,241,932 | 10/1917 | Davison | 249/76 |
| 1,561,550 | 11/1925 | Lee | 249/122 |
| 1,569,057 | 1/1926 | White et al. | 249/124 |
| 1,572,305 | 2/1926 | Nelson | 249/66 |
| 1,729,984 | 10/1929 | Canfield | 249/129 |
| 2,523,349 | 9/1950 | Wissinger | 249/129 |

FOREIGN PATENT DOCUMENTS

| | | | |
|---|---|---|---|
| 1043397 | 6/1953 | France | 294/67 E |
| 10548 | of 1910 | United Kingdom | 249/131 |

*Primary Examiner*—Willard E. Hoag

[57] ABSTRACT

The invention provides apparatus and method for forming concrete blocks, panels and the like with a reduced number of parts and production operations. The apparatus and method of this invention is contemplated for use at a concrete-mixing plant having the usual components such as mixers, hoists, cranes, and other transport facilities available at most modern mixing plants. The apparatus of the invention includes a pallet having a generally flat upper surface. In addition, there is provided a generally rectangular mold frame having four integral and generally vertical upstanding sides. The frame is generally open on the top and bottom and is dimensioned for matably mounting on the pallet. Cavity-shaping means are mounted within the frame and above the pallet for shaping block-forming molding cavities which are arranged for receiving concrete aggregate thereinto, whereby blocks may be formed by the deposition of the aggregate thereinto. The apparatus includes means for detachably connecting the cavity-shaping means to either the pallet or to the mold frame and means for separating the mold frame from the pallet after the aggregate has been poured and the initial setting thereof has occurred, while the cavity-shaping means in the form of cores or curtains remain in contact with the blocks and the blocks remain in contact with and are supported on the pallet. The method of this invention generally contemplates a plurality of steps which generally accomplish the production of concrete blocks with a minimum of steps.

11 Claims, 14 Drawing Figures 2
2
3
3
11
12
16
17
20
21
22
23
24
25
27
30
40
41
A
B
C
D 9
9
10
10
74
80
81
81
83
83
87
90
84
82
86
85
A
B
C
D
E

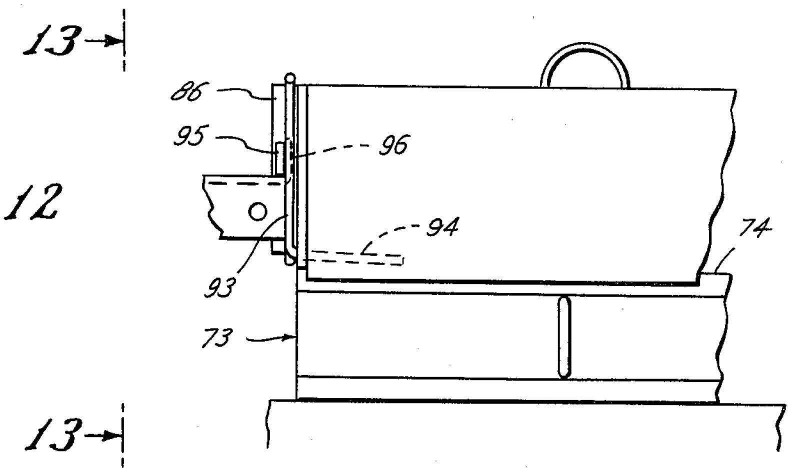
Fig. 12
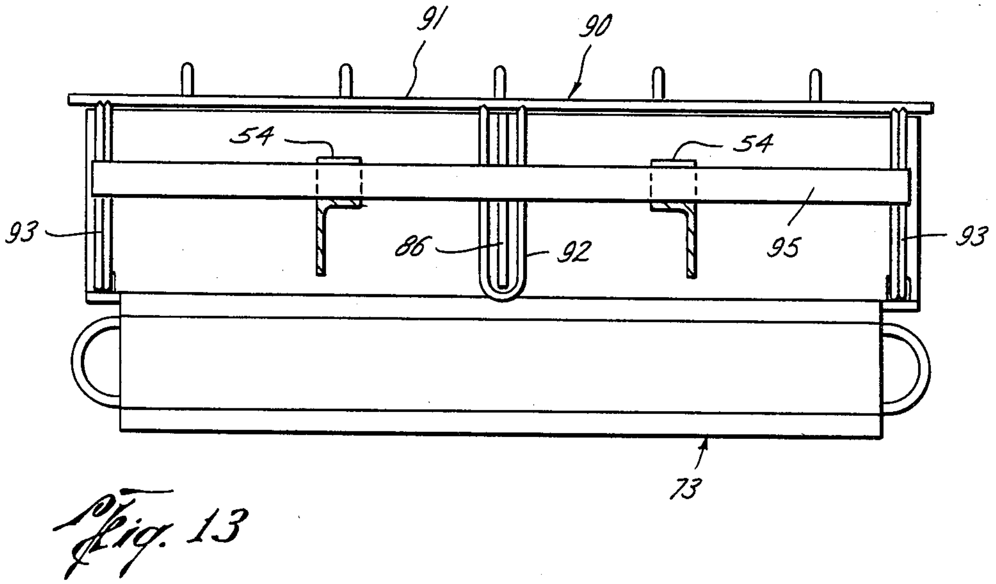
Fig. 13
Fig. 14
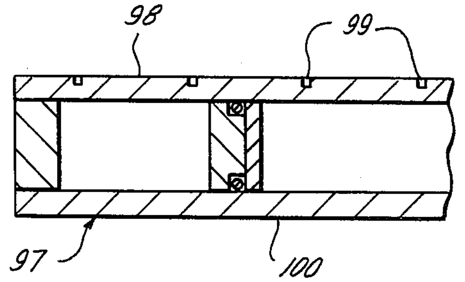

APPARATUS AND METHOD FOR FORMING CONCRETE BLOCKS, PANELS AND THE LIKE

BACKGROUND OF THE INVENTION

A. Field of the Invention

This invention relates to apparatus and method for forming concrete blocks, panels and the like which may be used for building purposes or the like.

B. Background of the Prior Art

There are many examples of prior art apparatus which have been developed for the general purpose of forming concrete blocks or the like from concrete aggregate. However, none of them have proved entirely satisfactory from the standpoint of simplicity of operation and ease of operation. Moreover, none of the prior art apparatus contemplate carrying out the forming operation utilizing cavity-shaping means such as cores or curtains which are left associated with the concrete blocks when the mold is separated from the pallet.

For example, there are many prior art patents which teach the removal of core members from the top along with the frame after the initial setting and the following U.S. patents are generally illustrative of this apparatus and method: U.S. Pat Nos. 1,621,194; 1,905,975; and 2,532,049.

In addition, there are many prior art U.S. patents which contemplate the removal of the core members or the like from the bottom of the mold at the time the mold is separated from the blocks, and these include the following: U.S. Pat. Nos. 1,573,336; 1,574,585; 1,687,010; and 1,891,764.

It is therefore an object of the present invention to provide an improved apparatus and method for forming concrete blocks or the like with a minimum of parts or steps.

Briefly stated, the apparatus of this invention includes in combination a pallet element having a generally flat upper surface. It also includes a generally rectangular mold frame element having four integral and generally vertical upstanding sides. The frame element is generally open on the top and bottom and is dimensioned for matably mounting over the pallet element. Cavity-shaping means in the form of either cores or curtains are mounted within the frame element and above the pallet element for shaping block-forming molding cavities for receiving concrete aggregrate thereinto, whereby blocks or panels may be formed by deposition of aggregate therein. Means are provided for detachably connecting the cavity-shaping means to one of the elements noted above. Means are also provided for separating the frame element from the pallet element after the aggregate has been poured and initial setting thereof has occurred, while said cavity-shaping means remains in contact with the blocks or panels and the blocks or panels remain in contact with and are supported on the pallet element.

The method of this invention is for forming concrete blocks, panels and the like and includes the steps of forming a pallet element having a generally flat upper surface. Then a generally rectangular mold frame element having four integral and generally vertically upstanding sides and a generally open top and bottom is matably mounted on the pallet element. Cavity-shaping means are then detachably mounted within the frame, with the cavity-shaping means being arranged for shaping block-forming molding cavities within the frame element and above the pallet element. Thereafter, concrete aggregate is poured into the upper open ends of the cavities to a predetermined depth. The concrete aggregate is then cured to an initial setting hardness to thereby form concrete blocks or panels. The mold frame element is then removed from the blocks or panels, the pallet element and the cavity-shaping means while the blocks or panels and cavity-shaping means remain supported on the pallet.

There is thus provided an apparatus and method whereby the cavity-shaping means may be left in association with the blocks or panels for more permanent storage and transport to the use or construction site, which aids in the maintenance of the quality of the blocks or panels upon delivery thereof.

BRIEF DESCRIPTION OF THE DRAWINGS

FIG. 1 is shown in four phases as designated by Sections A, B, C and D which generally depict the sequence of operations of the apparatus of this invention.

FIG. 12 is a view similar to FIG. 5 but showing alternative separating means for separating the frame and pallet shown in FIGS. 8–10.

FIG. 13 is a sectional view taken generally along line 13—13 of FIG. 12.

FIG. 14 is a cross-sectional and fragmentary view of an alternate embodiment of a pallet of this invention showing recesses on both the top and bottom side whereby the pallet may be inverted for varying the size or shape of blocks formed by the apparatus of this invention.

DESCRIPTION OF THE PREFERRED EMBODIMENTS

Figure 1:
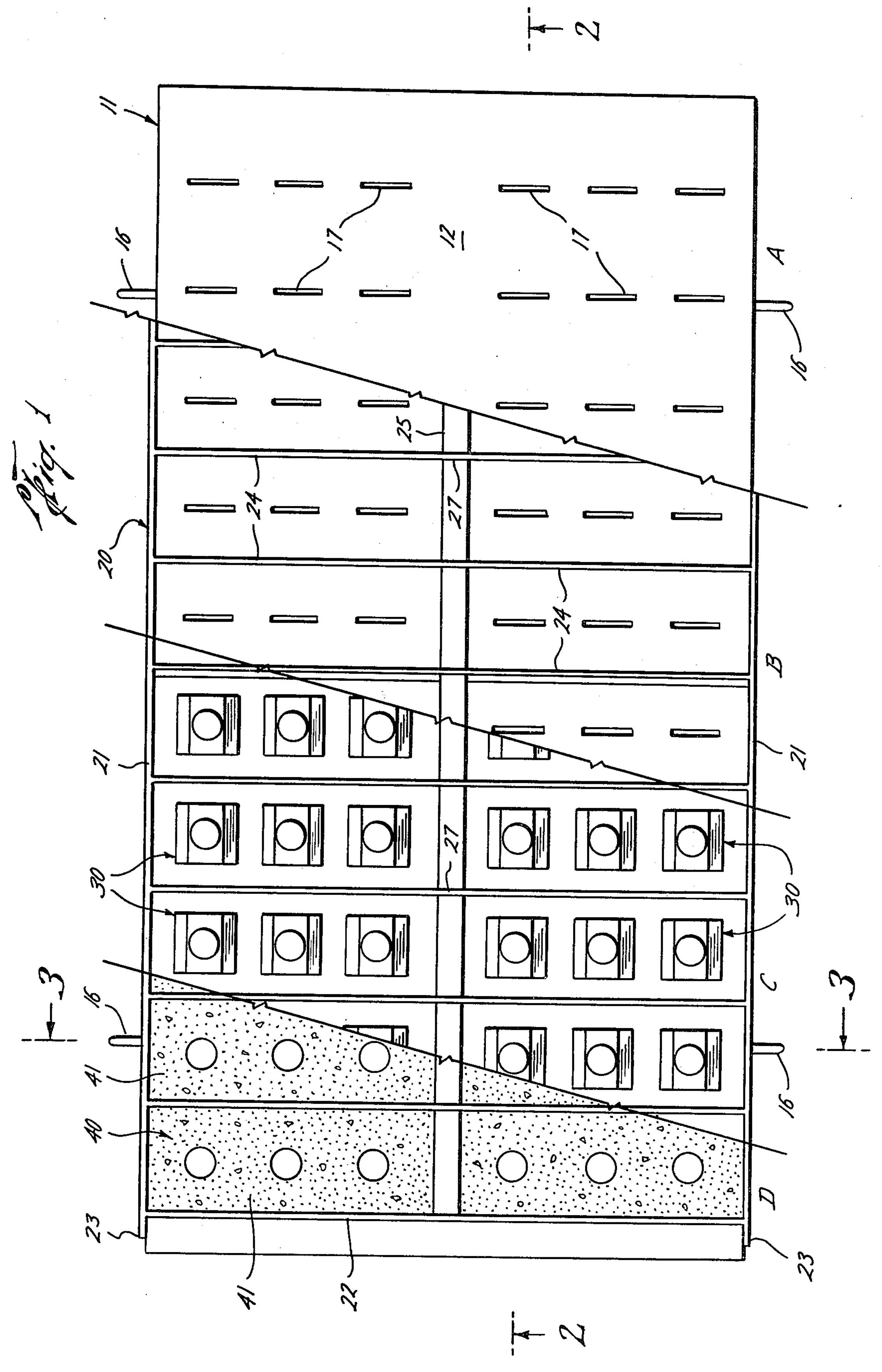
FIG. 1 is a top plan view of one embodiment of the apparatus of this invention arranged for forming concrete blocks having one or more vertically extending hollow cores therethrough.
Figure 2:
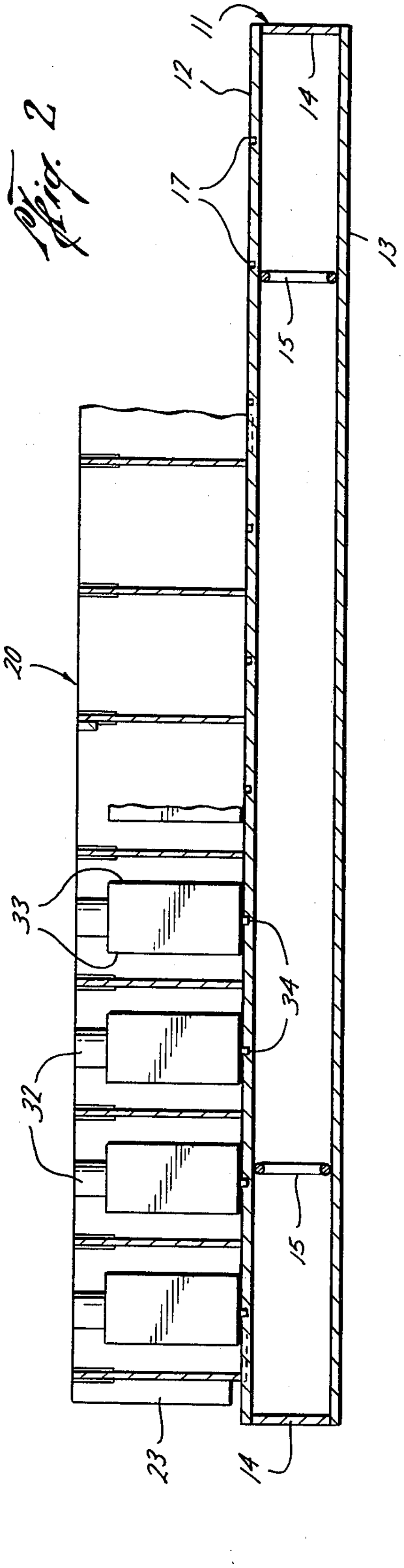
FIG. 2 is a cross-sectional view taken generally along line 2—2 of FIG. 1.
Figure 3:
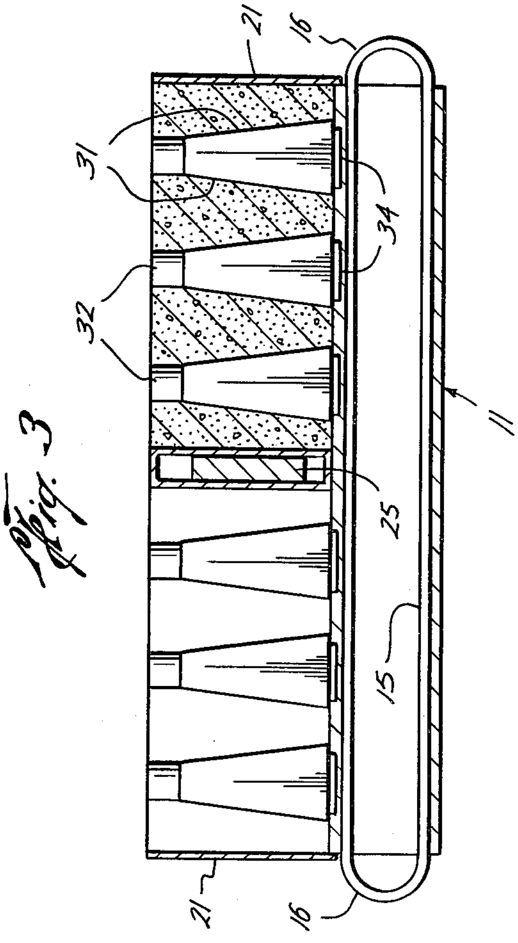
FIG. 3 is a cross-sectional view taken generally along line 3—3 of FIG. 1.

Referring now in particular to FIGS. 1–3, the pallet element of this embodiment generally includes a pallet 11 which is generally rectangular in plan view and is provided with a generally flat upper surface 12 and a flat lower surface 13. The ends of pallet 11 as seen in FIG. 2 may be closed by end walls 14. In addition, pallet 11 is supported by a pair of generally ovoid-shaped cross braces 15 having looped ends on each side thereof which extend beyond the perimeters of upper surface 12 and form lifting eyes 16. Upper surface 12 of pallet 11 is provided with a plurality of uniformly spaced and generally transversely extending grooves 17 which are of uniform depth and which do not penetrate all the way through the member forming upper surface 12. These grooves form part of the means for detachably connecting cavity-shaping means to pallet 11, as will be described hereinafter.

The mold frame element of this embodiment includes a generally rectangular old frame 20 having four integral and generally vertically upstanding sides, the sides being a pair of side walls 21 and a pair of opposed end walls 22. It will be noted that end walls 22 are of slightly greater than the width of pallet 11 and that side walls 21 are higher than end walls 22 and extend down slightly therebelow such that side walls 21 extend over and engage the edges of the member forming top surface 12, as best seen in FIG. 3, to make a seal to prevent aggregate from flowing therethrough.

Mold frame 20 is also provided with a pair of end lugs 23 on at least one end thereof which are generally extensions of side walls 21 but terminate short of the upper surface 12 of pallet 11 as best seen in the left end of FIG. 2. These lugs may be sometimes referred to as at least a part of the means for separating the mold frame 20 from pallet 11, as will be described hereinafter.

Figures 5, 6, 7:
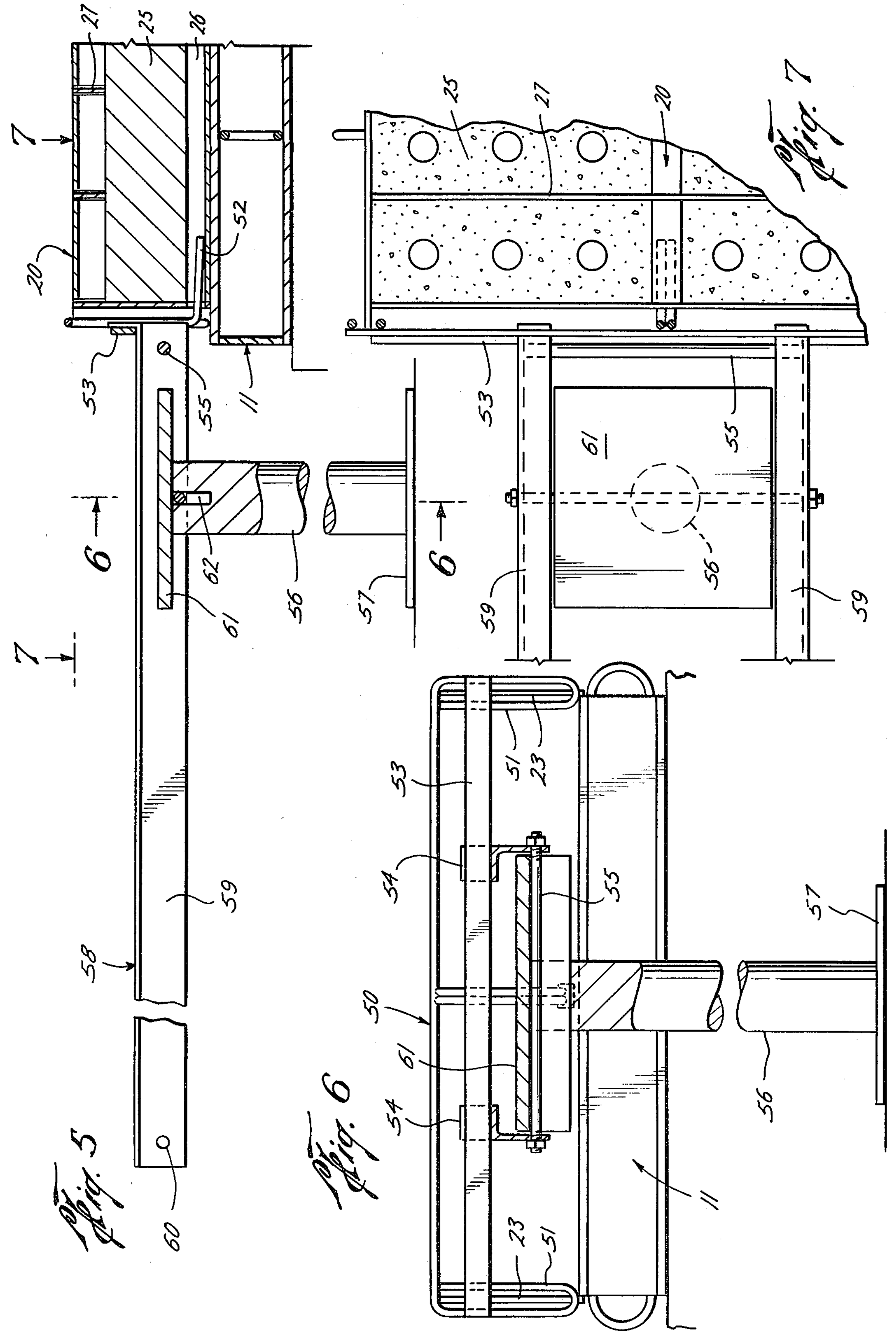
FIG. 5 is a generally central sectional view of apparatus for separating the mold frame element from the pallet element.
FIG. 6 is a sectional view taken generally along line 6—6 of FIG. 5.
FIG. 7 is a partial top plan view taken generally along line 7—7 of FIG. 5.

Mold frame 20 is provided with a plurality of generally uniformly spaced and transversely extending partition walls 24 which extend between and are supported by side walls 21 at each end thereof. Partition walls 24 are also supported at the midportions thereof by a generally longitudinally extending central partition 25 connected to and supported at each end by one of the end walls 22. As best seen in FIG. 5, central partition 25 is formed with a logitudinally extending opening 26 along the bottom edge thereof for receiving and engagement with separation means which are to be described hereinafter. In addition, central partition 25 has a series of uniformly spaced recesses along the upper edge thereof arranged for receiving mating portions 27 of partition walls 24.

Mold frame 20 as shown in phase or section C of FIG. 1 has mounted therein a plurality of cavity-shaping means in the form of cores 30. It is to be understood that cores 30 may take many different shapes, but the embodiments shown in FIGS. 1 and 1–3 are tapered inwardly and upwardly on two sides, which sides are designated by the numerals 31 which sides terminate in a cylindrical portion 32. Sides 31 are joined by generally vertically extending opposed sides 33. It is to be understood that cores 30 may take many different forms such as frusto-conical, conical, pyramidal or the like, but it is important that the upper ends thereof be of a reduced area as compared with the base portions thereof to facilitate removal of the same from the blocks which are being molded. Cores 30 may be made of solid timber or wood material or hollow plastic in various shapes and preferably of low-cost material since it is not contemplated that they will necessarily be used again, and they may be shipped to the construction site along with the blocks being manufactured.

Cores 30 are also provided with means for detachably connecting the same to pallet 11 and these take the form of a downwardly extending lip 34 attached to the base of each of the cores 30, as best seen in FIGS. 2 and 3. Each of the lips 34 is arranged for mating engagement with one of the grooves 17 to thereby prevent longitudinal displacement of cores 31 relative to pallet 11 during the aggregate-pouring operation to be described hereinafter. It is also to be understood that grooves 17 may take many shapes, spacings and configurations so as to accommodate different size and shaped cores whereby the shape of the concrete blocks which are to be formed may be varied as needed or required.

In operation of the apparatus heretofore described in FIGS. 1–3, pallet 11 is initially provided on a horizontal base with the upper surface 12 or 13 clear of any debris or the like. It is to be understood that pallet 11 may be made of timber, aluminum, fiberglass or other type material which may be coated with epoxy if required to facilitate release of the formed concrete blocks therefrom. With pallet 11 so positioned, mold frame 20 is matably mounted thereover, as shown in Phase or Section B of FIG. 1. Mold frame 20 may be made from aluminum or other metal or the like and may, if desired, be coated with epoxy or the like to facilitate release of the products from the mold.

Thereafter, cores 30 are positioned in mold frame 20 in the manner shown in Phase or Section C of FIG. 1 with the lower depending tongues 34 thereof engaging the grooves 17 as seen in FIG. 2. Thus positioned and arranged, the apparatus is ready for the receipt of concrete aggregate into the mold cavities thus formed, which aggregate is generally designated by the numeral 40 in the figures. It is to be understood that other forms of hardenable material may be used and the term "aggregate" is contemplated as covering other such material. The concrete aggregate is deposited by conventional means into the upper openings of the cavities shown in FIGS. 1–3 to desired level.

After concrete aggregate 40 is deposited in mold frame 20 as shown in Section D of FIG. 1, the same is maintained until initial hardening by normal means or it may be exposed to steam curing and/or vibration to accelerate compacting and hardening process. Upon completion of the initial setting stage of aggregate 40, mold frame 20 is removed independently from the concrete aggregate, which has now become blocks 41, without removal of cores 30 from pallet 11 and without removing blocks 41 from the top of pallet 11, whereby cores 30 remain in constant contact with the interior hollow cores of blocks 41, and blocks 41 continue to be supported by the upper surface 12 or 13 of pallet 11. Thus separated, pallet 11 with blocks 41 supported thereon may be moved by any conventional hoisting means attaching to lifting eyes 16, and indeed may be transported to the construction site thereby, with cores 30 in place. It is to be understood that cores 30 may be considered disposable and may be discarded when the blocks are used.

Referring now to FIGS. 5–7 in particular, the apparatus for carrying out the aforesaid separation step will now be described. A clamp generally designated by the numeral 50 is supported on the left end of pallet 11 and frame 20, as best seen in FIG. 5. Clamp 50 is provided on each end thereof with a generally depending loop portion 51, each of which is arranged for engaging a lug 23 on the lower end thereof. In addition clamp 50 is provided with a forwardly-extending finger 52 which is arranged for insertion into the end of opening 26 in central partition 25. Clamp 50 is also provided with a horizontally-extending strap 53 on the rearward side tracted and mold frame 80 separated as heretofore described. Wall member 84 may be left in position together with lintels 71 during the further curing and transportation stages to their ultimate destination if desired, and with mold frame 80 and curtains 83 now being ready for another use with alternative shapes. It is to be understood that the aforesaid curtains may be made of solid timber, aluminum, or other material coated with epoxy. They may also be of different thicknesses and heights as desired to produce a variety of forms and shapes of lintels, panels or other concrete blocks.

Referring now to FIG. 14, an optional form of pallet of this invention is generally shown and designated by the numeral 97. In this embodiment, the upper surface may have a plurality of transversely-extending grooves 99, while the lower surface 100 may be plain and free from any grooves. It is to be understood that grooves 99 may be of different lengths, spacings and the like, such that in one molding operation, upper surface 98 may be utilized with the embodiment shown in FIGS. 1-3 and in an alternate operation, lower surface 100 may be used as the upper surface for accommodating a variety of shapes of lintels and panels.

It will thus be observed that this invention provides a novel apparatus and method for producing concrete blocks or panels with a minimum of parts and equipment and which parts and equipment are highly interchangeable so as to provide a variety of combinations for producing a variety of different shaped blocks or panels as desired. This apparatus and method also provide a system wherein the cores and other separation elements or curtains may be retained within or between the blocks while they are supported on the pallet for transport to the ultimate building site.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. Apparatus for forming concrete blocks and the like, the combination comprising:

a pallet having a generally flat upper surface and having a plurality of grooves provided in said upper surface;

a generally rectangular mold frame having four integral and generally vertically upstanding sides, said frame being open on the top and bottom and dimensioned for matably mounting on said pallet, said frame having a plurality of generally vertical partition walls extending between at least two of said side walls forming a plurality of mold cavities open on the upper ends thereof for receiving aggregate therein;

at least one mold core mounted within each of said mold cavities and connected to said grooves in said pallet, each of said cores having sides tapered generally inwardly toward the top thereof whereby said cores remain supported on and connected to said pallet when said frame is separated from said pallet;

and means for separating said rectangular frame from said pallet after aggregate has been poured into said mold cavities and initial setting thereof has occurred to form blocks while said cores remain in contact with said blocks and said blocks remain in contact with and are supported on said pallet.

2. The invention as claimed in claim 1 wherein:

a first pair of the opposed sides of said frame element are longer than the width of said pallet element and the height of said other second pair of opposed sides of said frame element is shorter than said first pair, whereby the lower edges of said second pair rests on said upper surface of said pallet element and the lower edges of said other pair extend below said upper surface.

3. The invention as claimed in claim 1 wherein:

said frame has lug means attached to at least one end thereof for engagement by said separating means.

4. The invention as claimed in claim 1 wherein:

said pallet has a lower surface generally parallel with said upper surface;

with said lower surface having a plurality of grooves therein of a different spacing than the grooves of said upper surface;

whereby said pallet can be inverted for use in accommodating cores of different spacing to thereby vary the size and shape of blocks formed.

5. The invention as claimed in claim 1 wherein:

said frame has a central partition extending between the ends thereof and arranged to divide said frame in halves and to centrally support said partition walls.

6. In apparatus for forming concrete blocks and the like, the combination comprising:

a pallet having a generally flat upper surface;

a generally rectangular mold frame having four integral and generally vertically upstanding sides, same frame being generally open on the top and bottom and being dimensioned for matably mounting on said pallet;

cavity-forming means mounted within said frame and above said pallet defining with said frame block-forming mold cavities for receiving cement aggregate therein, whereby blocks may be formed by deposition of aggregate therein;

and means for separating said frame from said pallet after said aggregate has been poured and initial setting thereof has occurred while said cavity-forming means remains in contact with said blocks and said blocks remain in contact with and are supported on said pallet, said separating means including a pedestal positionably adjacent to one end of said frame, a lever pivotally mounted on said pedestal, and means for connecting an end of said lever to said frame, whereby said frame is raised from said pallet by rotation of said lever.

7. The invention as claimed in claim 6 wherein:

said means for connecting said lever to said frame includes a clamp engageable with said lug means and said lever.

8. The invention as claimed in claim 6 wherein:

said pallet has a pair of lifting eyes attached to each edge of two opposed edges thereof, whereby said thereof which is arranged for engagement by a pair of generally pivotally mounted and upstanding arms 54 which are pivotally mounted on a horizontally-extending pin 55. Pin 55 passes through and is supported for pivotal movement by an upstanding pedestal column 56 having a horizontally-extending base 57 positionable generally adjacent to the end of pallet 11. Pin 55 has journalled thereon for rotation thereabout a lever generally designated by the numeral 58 which is comprised of parallel extending lever members 59 which are held together at the left end thereof, as seen in FIG. 5, by pin 60 and held spaced apart by rectangular upper pedestal top 61.

Figure 4:
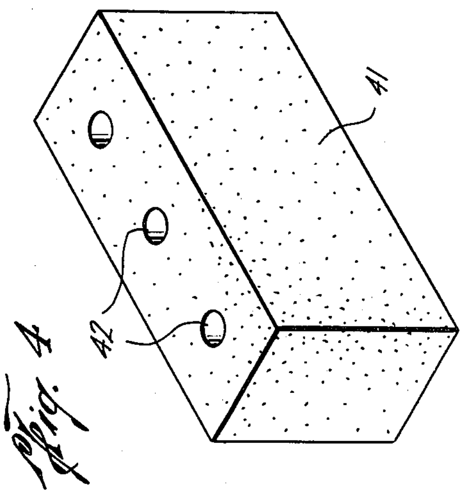
FIG. 4 is an isometric view of one block formed utilizing the apparatus shown in FIGS. 1–3.

When it becomes desirable to separate mold frame 20 from the concrete blocks 41, cores 30 and pallet 11 without substantially distrubing the relationships of these latter three elements, then pedestal column 56 is generally positioned in the manner shown in FIG. 5. Clamp 50 is attached to the end of frame 20 in the manner shown in FIG. 5 with loop portions 51 engaging lugs 23 and finger 52 extending into opening 26. Thereafter, by applying a downward pressure on the opposite end of lever 58, arms 54 are caused to engage strap 53 of clamp 50, thereby gently separating and urging upwardly mold frame 20 with respect to blocks 41, cores 30 and pallet 11. A repeated gentle rocking action or motion of this nature will facilitate easy separation. Thus released, mold frame 20 may thereafter readily be removed and used again in repeated operation. Blocks 41 with cores 30 therein continue to be supported by pallet 11 which may then be transported to a more permanent curing site and thence to a construction site in the manner heretofore described. Thus manufactured block 41 as shown in FIG. 4 has three vertically extending cores holes 42, the upper end of which are generally circular as a result of the cylindrical portion 32 of core 30. It is to be understood that blocks 40 may take various configurations and dimensions and that core holes 40 may be formed in different shapes as discussed above.

Figure 8:
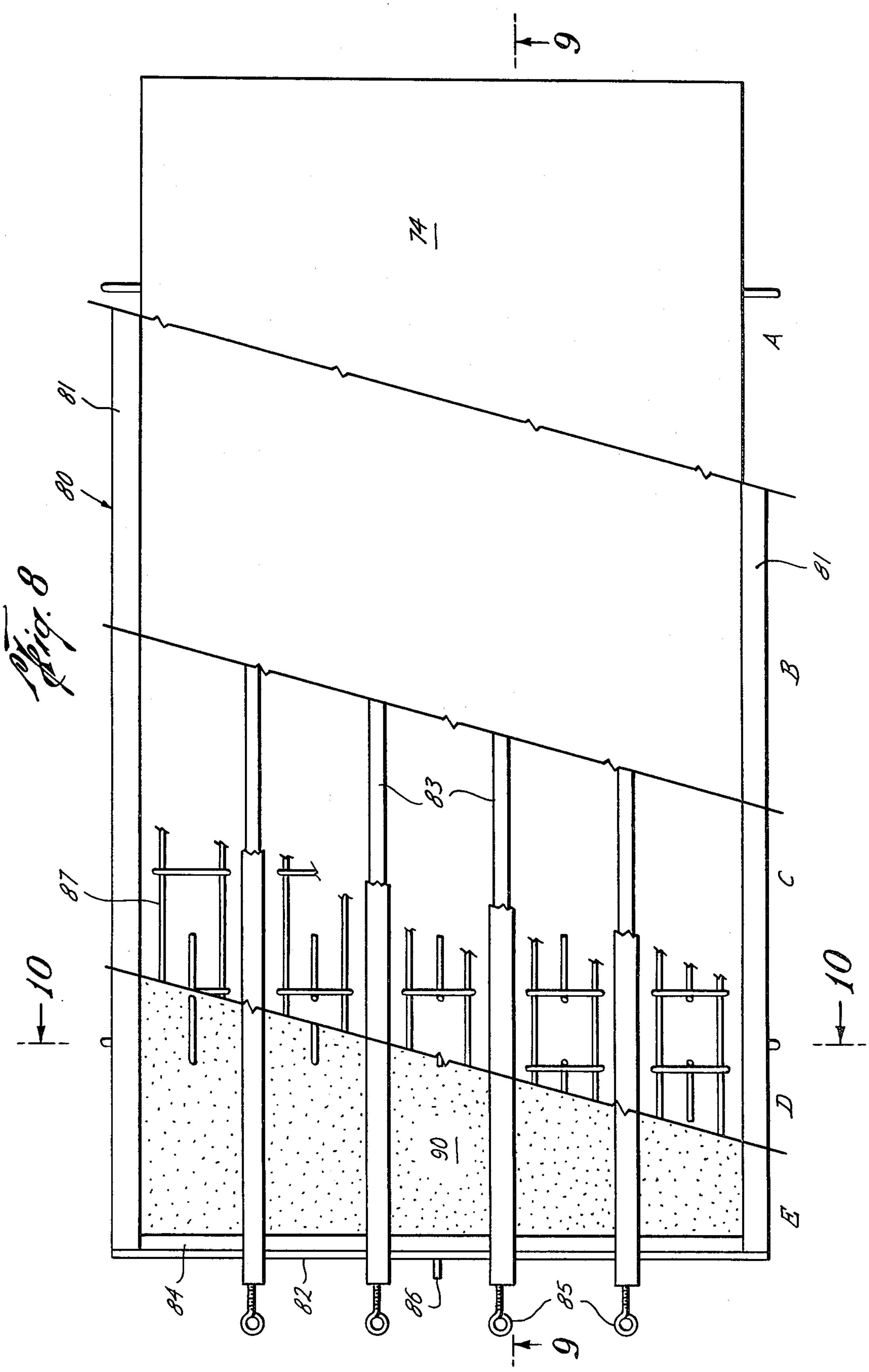
FIG. 8 is a top plan view in five phases A–E similar to FIG. 1, but showing an alternate embodiment of the apparatus for this invention for making lintels or wall panels which may sometimes also be referred to herein as blocks or concrete blocks.
Figure 9:
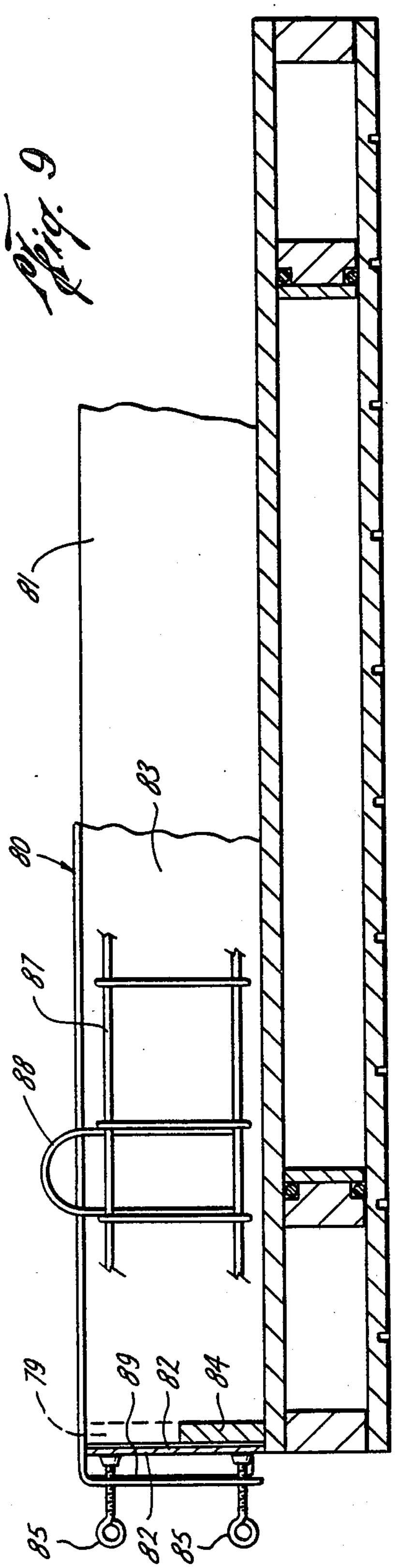
FIG. 9 is a cross-sectional view taken generally along line 9—9 of FIG. 8.
Figure 11:
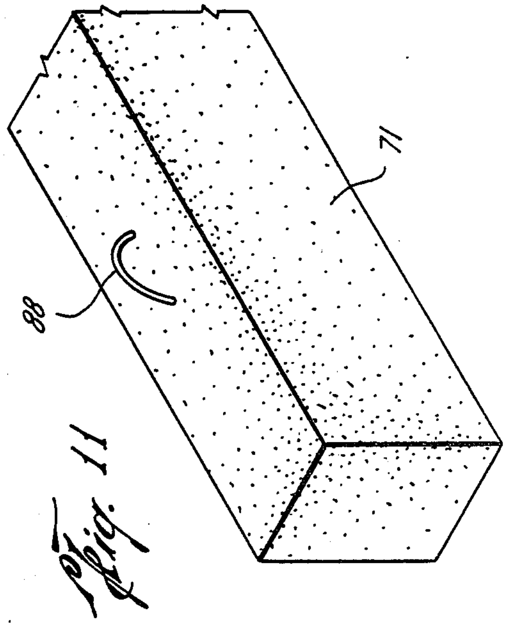
FIG. 11 is an isometric view of one concrete block or lintel made in accordance with the apparatus shown in FIGS. 8–10.
Figure 10:
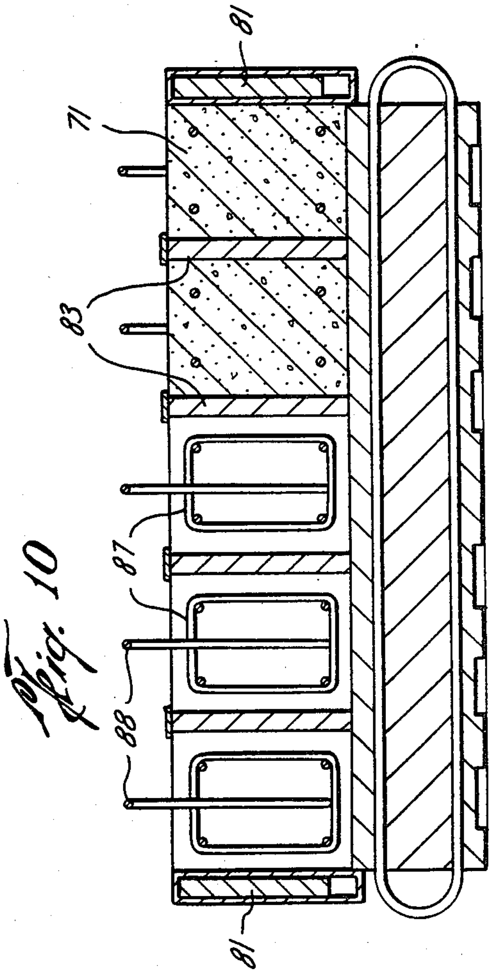
FIG. 10 is a cross-sectional view taken generally along line 10—10 of FIG. 8.

Referring now to FIGS. 8–10 in particular, an alternate embodiment of the invention will now be described, which apparatus is arranged for making concrete blocks of a different configuration which sometimes may be referred to as lintels, panels and the like, such as lintel 71 shown in FIG. 11. In this embodiment there is provided a generally rectangular pallet 73 which is generally similar to pallet 11 except that the upper surface 74 of pallet 73 does not have any gooves therein as with pallet 11, although the lower surface 75 is shown with uniformly spaced transverse grooves 76 such that surface 75 can be used as the upper surface when pallet 73 is being used in the mode of operation as described with respect to FIGS. 1–3.

The mold frame element of this embodiment includes mold frame 80 having four integral and vertically upstanding sides in the form of side walls 81 and end walls 82. End wall 82 is proided with a generally upstanding and centrally-positioned hug 86, which is generally similar to one of the lugs 23 of the prior embodiment. In this embodiment, the cavity-shaping means mounted in frame 80 includes a plurality of generally vertical curtains 83 which extend generally longitudinally of frame 80 and generally parallel with side walls 81. Each end of a curtain 83 is arranged for frictional engagement with and support by an end wall 82 provided at either end of mold frame 80 and generally parallel with and interior of an end wall 82 as best shown in FIG. 9. Wall members 82 also serve to close the ends of the mold cavities formed by curtains 83.

Wall members 82 are adjustably supported by a plurality of rotatable members in the form of rotatable eye-bolts 85 which are threadably engaged in a downard extension 89 provided at each end of panels 81 and 83, and with the forward ends thereof arranged for contact with and support of wall member 82, as shown in FIGS. 8 and 9. Optionally, and as shown in FIGS. 9 and 10, end wall 82 may be occasionally panelled with a wall member 84, having downwardly facing slots arranged to mate with end lugs 79 provided at each end walls 81 and 83. When it becomes desirable to separate mold frame 80 from pallet 73, as will be described hereinafter, eye-bolts 85 may be turned to retract so as to free walls 82 and 84 from contact with the lintels 71 and curtains 83.

With curtains 83 thus mounted and supported in the manner shown in FIGS. 8–10, reinforcing means may be deposited in the cavities formed thereby, which reinforcing means may take the form of generally boxshapd reinforceing bars or wires 87, having one or more upstanding loops 88 which may be used as a lifting eye for handling purposes at a later stage of the operation.

With the apparatus shown in the phase or section D of FIG. 8, concrete aggregate may then be deposited thereinto as with the prior embodiment, which aggregate is designated generally by the numeral 90 as shown in FIG. 8.

When it becomes desirable to separate mold frame 80 from pallet 73 and lintels 71, and after concrete aggregate has assumed at least an initial set, eye bolts 85 will first be fully retracted. Thereafter, clamp 90 is mounted on the end of mold frame 80 in the manner shown in FIGS. 12 and 13. Clamp 90 includes a generally horizontal extending upper bar 91 which has depending from the central portion thereof loop 92 which is arranged to engage lug 86 on the lower end thereof. Clamp 90 also includes two outboard vertical bars 93 depending from bar 91. Bars 93 have fingers 94 projecting forwardly therefrom for engaging a lug at the lower end of sidewalls 81. In addition, clamp 90 includes a horizontally extending bar 95 which is connected to loop 92 and bars 93 and so arranged that the lever means described in connection with FIGS. 5–7 may be used to separate mold frame 80 and curtains 83 from pallet 73 and lintels 71, while walls 84 remain in position with lintels 71. With clamp 90 thus assembled and positioned, the arms 54 of the heretofore described lever means are engaged under strap bar 95 and bar 91 engaged under the ends of curtains 83 to achieve separation as with the prior embodiment.

The operation of this alternate embodiment of the invention for making lintels is substantially the same as that described with respect to the prior embodiment. Pallet 73 is provided in the condition and manner shown in Phase or Section A of FIG. 8 with a clean upper surface 74. Thereafter, mold frame 80 is mounted thereover as shown in Phase B with curtains 83 and wall members 84 supported therein in the manner shown in phase E. Reinforcing bars or wires 87 may then be mounted as shown in Phase D, after which aggregate, such as aggregate 90, is applied to the cavities thus formed to the desired dimensions. As with the prior embodiment, the aggregate is then allowed to assume an initial hardening or setting, accompanied by vibration or other curing operations, as discussed above. Upon completion of the initial curing step, bolts 85 are repallet may be moved about by attachment of lifting means thereto.

9. The invention as claimed in claim 6 wherein:

said cavity forming means includes a plurality of generally vertical curtains extending generally between two opposite ends of said frame to form a plurality of generally elongate block-forming mold cavities which are generally open on the upper ends thereof for receiving aggregate thereinto;

and wherein said detachable connecting means includes means for detachably clamping the ends of said curtains in fixed relationship to said two opposite ends of said frame, whereby said curtains together with said frame can be detached and removed from said blocks and said end walls remaining on said pallet.

10. The invention as claimed in claim 9 wherein said means for detachably clamping said ends of said curtains includes two sets of movable wall members, one of which can be mounted transversely to the adjacent ends of said curtains and adapted to engage and to close the adjacent ends of said elongate cavities, and the other one of which is mounted to similarly engage the opposite ends of said curtains and to close the other ends of said cavities;

and adjustable support means fixed to said opposite ends of said frame and said movable wall members, whereby said curtains may be alternately clamped in place and released by operation of said support means.

11. The invention as claimed in claim 10 wherein:

said support means includes rotatable members frictionably engaged with said opposite end walls.

* * * * *

UNITED STATES PATENT AND TRADEMARK OFFICE

CERTIFICATE OF CORRECTION

PATENT NO. : 4,389,036

DATED : 06/21/83

INVENTOR(S) : Abou-Ezzeddine, Youssef; Houston, Tex.

It is certified that error appears in the above-identified patent and that said Letters Patent are hereby corrected as shown below:

Column 1, line 25, delete "1,621,194" and insert --762,194--; column 5, line 16, delete "distrubing" and insert --disturbing--; line 58, delete "proided" and insert --provided--; line 59, delete "hug" and insert --lug--; column 6, line 5, delete "dow-" and insert --down--; line 6, delete "nard" and insert --ward--; line 22, delete "shapd reinforceing" and insert --shaped reinforcing--.

Signed and Sealed this

*Eighth* Day of *November 1983*

[SEAL]

*Attest:*

GERALD J. MOSSINGHOFF

*Attesting Officer* *Commissioner of Patents and Trademarks*